(12) United States Patent
Trovato et al.

(10) Patent No.: US 8,282,124 B2
(45) Date of Patent: Oct. 9, 2012

(54) SIDE CURTAIN AIRBAG HAVING A MAIN CHAMBER AND AN EXTENSION CHAMBER

(75) Inventors: Sandi Marie Trovato, Bruce Township, MI (US); Mark Andrew Steinbach, Clawson, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/379,993

(22) Filed: Mar. 5, 2009

(65) Prior Publication Data

US 2010/0225097 A1    Sep. 9, 2010

(51) Int. Cl.
*B60R 21/232* (2011.01)
*B60R 21/2338* (2011.01)

(52) U.S. Cl. .................. 280/730.2; 280/743.2
(58) Field of Classification Search ............... 280/728.2, 280/729, 730.2, 743.1, 743.2
See application file for complete search history.

(56) References Cited

U.S. PATENT DOCUMENTS

| 7,658,401 B2 * | 2/2010 | Valdez et al. | 280/730.2 |
| 2007/0052212 A1 * | 3/2007 | Powals | 280/729 |
| 2007/0241544 A1 * | 10/2007 | Ohrvall et al. | 280/730.2 |
| 2008/0179865 A1 * | 7/2008 | Valdez et al. | 280/730.2 |
| 2008/0238055 A1 * | 10/2008 | Hotta et al. | 280/730.2 |
| 2009/0026742 A1 * | 1/2009 | Noguchi et al. | 280/730.2 |
| 2010/0013203 A1 * | 1/2010 | Mitchell et al. | 280/743.2 |

* cited by examiner

*Primary Examiner* — Ruth Ilan
*Assistant Examiner* — Barry Gooden, Jr.
(74) *Attorney, Agent, or Firm* — Foley & Lardner LLP

(57) ABSTRACT

A side airbag for use in a vehicle includes a main chamber extending along a ceiling of the vehicle and configured to restrain a head of a vehicle occupant when the airbag is deployed. The main chamber includes an inboard panel and an outboard panel that are joined together. The airbag also includes a forward chamber extending from the main chamber and configured to restrain at least a portion of the vehicle occupant when the airbag is deployed. The forward chamber at least partially overlaps at least one of the inboard and outboard panels of the main chamber when the airbag is stowed.

20 Claims, 4 Drawing Sheets

SIDE CURTAIN AIRBAG HAVING A MAIN CHAMBER AND AN EXTENSION CHAMBER

BACKGROUND

The present disclosure relates to an airbag configured to deploy along an interior side of a vehicle. When inflated, the airbag is configured in the shape of a curtain. The present application is directed to a curtain airbag configured to more effectively retain an occupant inside the vehicle, when the vehicle is involved in a rollover or side impact type event.

Most curtain airbags do not extend a sufficient distance downward from a storage location. Thus, in many cases the bottom edge of the airbag is above the side window sill. These curtain airbags provide coverage over only the upper portion of the side of the vehicle and in certain situations only protect the head of the occupant of the vehicle. Such airbags are generally not as effective at retaining occupants inside the vehicle in a side impact or rollover event.

It would be advantageous to provide a curtain airbag with a configuration that more effectively retains an occupant inside the vehicle in a side impact or rollover event. It would be advantageous to provide a curtain airbag that more effectively retains an occupant, while at the same time the airbag and airbag module can be stored in the vehicle under existing trim panels.

SUMMARY

One embodiment of the disclosure relates to an airbag module for use in a vehicle. The airbag module comprises an inflator configured to generate gas; and a side airbag coupled to the inflator and configured to deploy upon receiving gas from the inflator. The side airbag comprises a main chamber extending along an interior roof of the vehicle and configured to restrain a head of a vehicle occupant when the airbag is deployed. The main chamber comprises an inboard panel and an outboard panel joined together. The side airbag further comprises, an forward chamber extending from the main chamber towards an A-pillar of the vehicle and configured to restrain at least a portion of the vehicle occupant when the airbag is deployed. The forward chamber at least partially overlaps at least one of the inboard and outboard panels of the main chamber when the airbag is stowed.

Another embodiment of the disclosure relates to a side airbag for use in a vehicle. The side airbag comprises a main chamber extending along an interior roof of the vehicle and configured to restrain a head of a vehicle occupant when the airbag is deployed, the main chamber comprising an inboard panel and an outboard panel joined together. The side airbag further comprises an forward chamber extending from the main chamber towards an A-pillar of the vehicle and configured to restrain at least a portion of the vehicle occupant when the airbag is deployed. The forward chamber at least partially overlaps at least one of the inboard and outboard panels of the main chamber when the airbag is stowed.

Another embodiment relates to a side airbag for use in a vehicle. The side airbag comprises a main chamber extending along an interior roof of the vehicle and configured to restrain a head of a vehicle occupant when the airbag is deployed, the main chamber comprising an inboard panel and an outboard panel joined together. The side airbag further comprises a chamber extending from the main chamber and configured to restrain at least a portion of the vehicle occupant when the airbag is deployed. The chamber at least partially overlaps at least one of the inboard and outboard panels of the main chamber when the airbag is stowed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
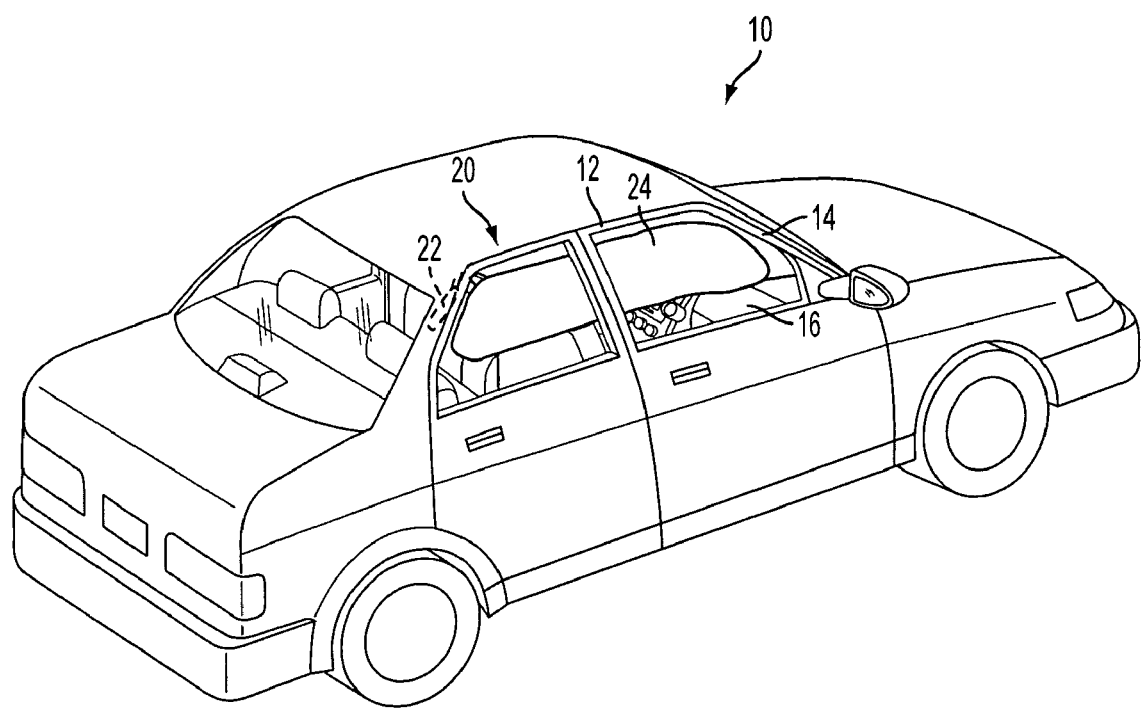
FIG. 1 is an isometric view of a vehicle including a side curtain airbag according to an exemplary embodiment.

Referring to FIG. 1-4, a vehicle 10 is shown including a side curtain airbag module 20 according to an exemplary embodiment. The side curtain airbag module 20 is provided to help protect the occupants of the vehicle 10 in a side impact. The airbag module 20 includes an inflator or gas generator 22, such as a conventional gas-filled or gas generating inflator, and an inflatable cushion or airbag 24. The curtain airbag 24 is preferably stored along the roof of the associated vehicle, for example, along the vehicle roof rail 12 above a window opening 16, in a conventional manner. The curtain airbag 24 is preferably secured in a folded state beneath a trim panel (not shown). The trim panel is snapped, screwed, or otherwise secured in place over the inflator 22 and the packed, folded curtain airbag 24.

The inflator 22 supplies gas for inflation/deployment of the restraint curtain airbag. The inflator 22 may be mounted along the vehicle roof side rail or in one of pillars of the vehicle frame (e.g., the B or C pillar). Thus, the inflator may be considered a rear or mid mount inflator depending on vehicle configuration and desired airbag deployment characteristics. During a vehicle side impact crash or rollover event, the inflator 22 is activated to supply pressurized gas to inflate the curtain airbag 24. The inflation gas enters the curtain airbag 24 and drives the curtain airbag 24 away from a storage position and downward into a deployed position. As shown best in FIGS. 3 and 4, in the deployed position, the curtain airbag 24 is disposed between the occupant and the side of the vehicle 10 and generally covers at least a portion of the window openings 16.

The curtain airbag 24 includes a main chamber 30 generally formed from a first panel 32 (e.g., inboard panel, inner panel, front panel, etc.) (FIG. 2A) and a second panel 34 (e.g., outboard panel, outer panel, rear panel, etc.) (FIG. 2B) that are coupled together by a plurality of sewn seams 36. According to an exemplary embodiment, the first panel 32 and the second panel 34 are a nylon fabric. The panels may be sewn together or secured by other suitable methods such as thermobonding or welding. The panels and the connecting seams may be coated with a sealant in order to reduce the leakage of inflation gas.

The curtain airbag 24 may be divided into two or more compartments or chambers. Passages or ports may be provided between individual chambers such that the chambers are in fluid communication with each other. The curtain airbag 24 may also include a plurality of un-inflated portions such as un-inflated portions that generally separate the chambers. One such un-inflated portion may be a panel 50 (e.g., sail panel) proximate to the front of the vehicle (e.g., proximate to the A-pillar 14). The sail panel 50 is coupled, on one end, to the vehicle A-pillar 14 and, on the opposite end, to the main body or chamber 30 of the curtain airbag 24. According to one exemplary embodiment, the sail panel 50 is coupled to the second panel 34 (e.g., with a sewn seam 52). The sail panel 50 may also be integrally formed with one or both of the fabric panels 32, 34. In an alternative embodiment the sail panel 50 may be a separate belt type tether connecting the airbag panels to the A pillar.

To provide additional protection for the vehicle occupant, one or more extensions or chambers may be provided about the periphery of the main chamber 30 to extend the coverage area of the curtain airbag 24. According to one exemplary embodiment, the extension is a forward chamber 40 provided proximate to the forward sail panel 50. The forward chamber 40 is configured to occupy a space forward of the main curtain airbag chamber 30 and inboard of the sail panel 50. The forward chamber 40 reduces the likelihood of a portion of an occupant's body (i.e., the occupant's head) colliding with a structural body in the vehicle 10 such as, for example, the vehicle door panel or the vehicle side structure, etc. The chamber 40 further increases the capability of the curtain airbag 24 to retain the occupant within the vehicle 10 in a side impact. As shown in FIG. 3, the forward chamber 40 is located inboard and overlapping from the sail panel or tether 50 so that the sail panel 50 provides further support to the forward chamber 40 when the occupant contacts the airbag. While the chamber 40 is shown in the figures as a forward chamber 40 in the FIGS. 1-3 and 5, according to other exemplary embodiments, the chamber 40 may be provided at other locations relative to the main chamber 30 such as along the lower edge or towards the rear of the vehicle (e.g., a rear chamber located proximate to the C-pillar, as shown in FIG. 4).

Figure 2A:
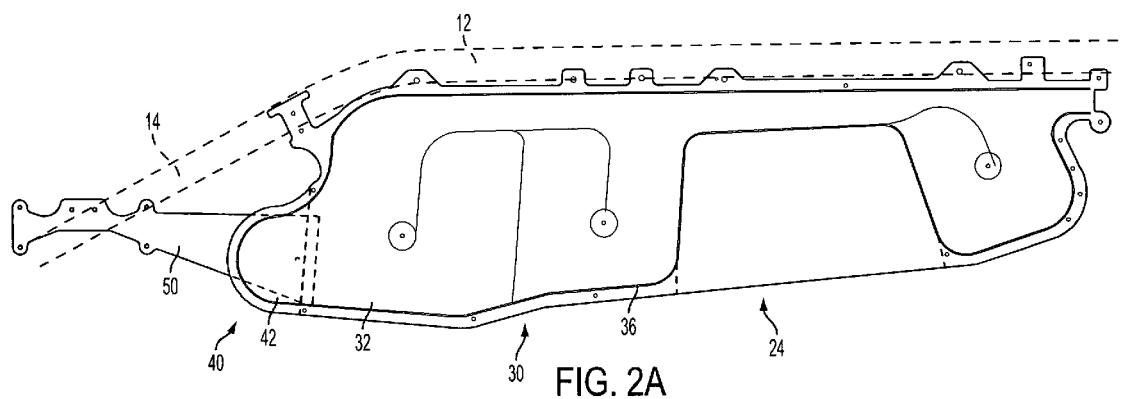
FIGS. 2A and 2B are front (inboard) and rear (outboard) views of a side curtain airbag with an additional forward chamber in an uninflated state according to an exemplary embodiment.
Figure 2B:
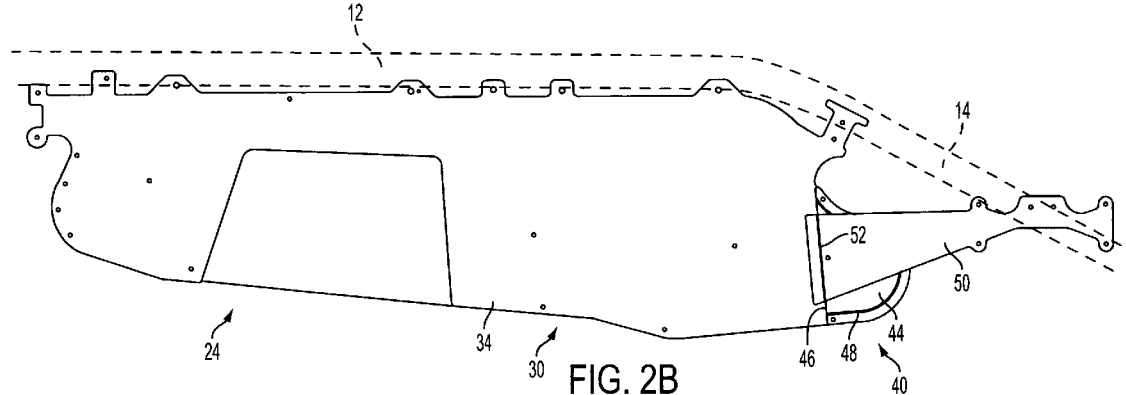
Figure 3:
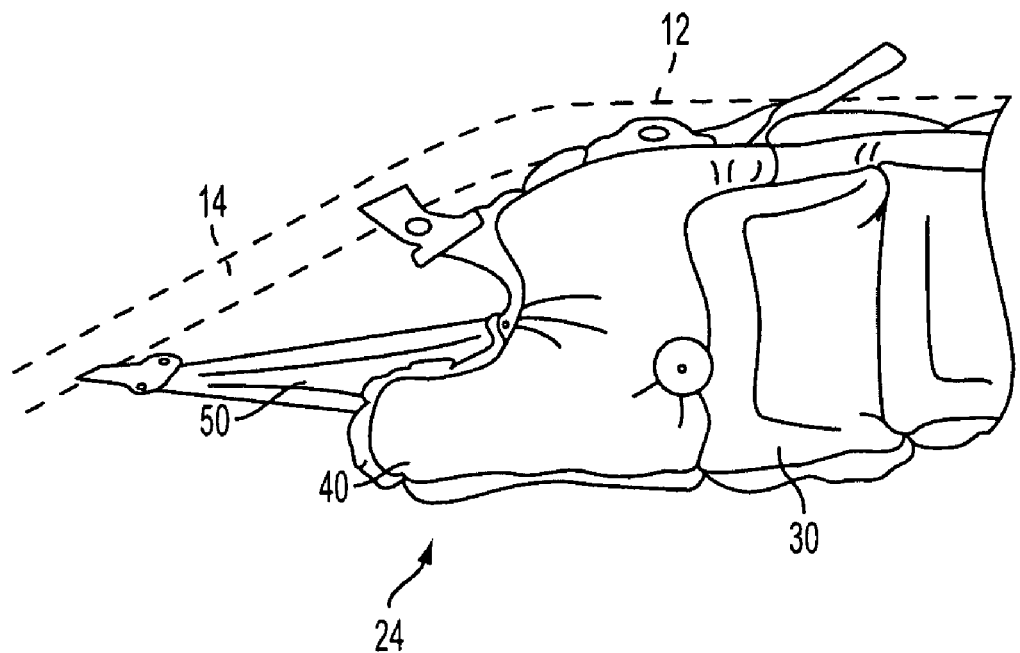
FIG. 3 is a side view of a vehicle interior showing the side curtain airbag of FIG. 2 in an inflated state according to an exemplary embodiment.

As shown best in FIGS. 2A and 2B, the forward chamber 40 is formed from a first (inboard) panel 42 and a second (outboard) panel 44. Both the first panel 42 and the second panel 44 are provided inboard relative to the sail panel 50. A sewn seam 48 is provided along a portion of the periphery of the panels 42 and 44 to couple the panels together. According to an exemplary embodiment, the inboard panel 42 of the forward chamber 40 may be an integrally formed flap or extension of the inboard panel 32 of the main curtain airbag chamber 30. The outboard panel 44 of the forward chamber 40 may be a separate fabric panel that is coupled to the outboard panel 34 of the main curtain airbag chamber 30 with a sewn seam 46 proximate to the sewn seam 52 coupling the sail panel 50 to the outboard panel 34 of the main curtain airbag chamber 30. According to another exemplary embodiment, the outboard panel 44 of the forward chamber 40 and the outboard panel 34 of the main curtain airbag chamber 30 may be formed similarly to the inboard panels 32 and 42 as a single integrally formed panel.

Figure 4:
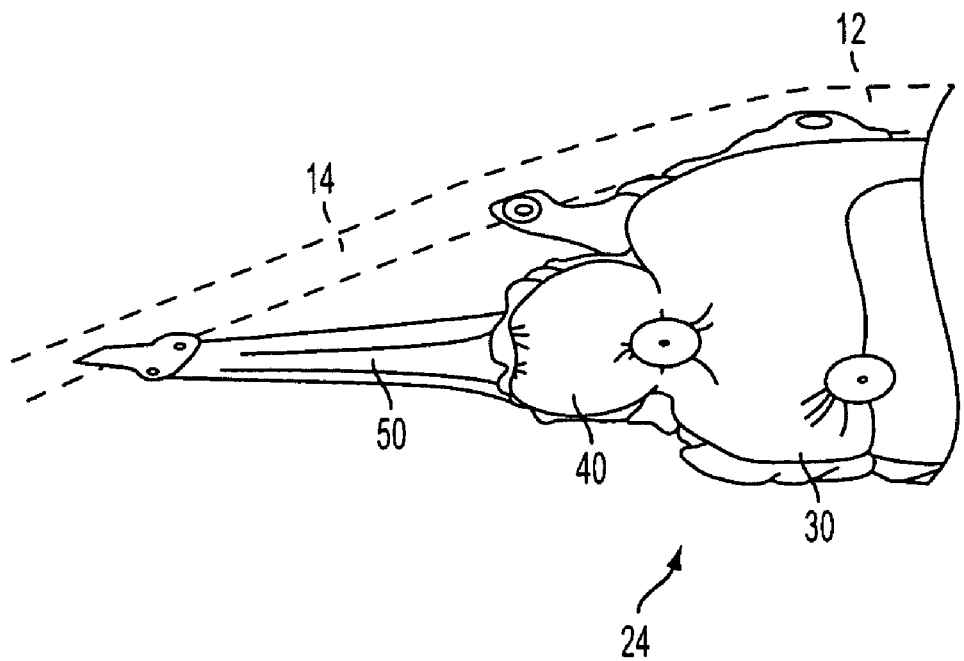
FIG. 4 is a side view of a vehicle showing a side curtain airbag according to another exemplary embodiment in an inflated state.

FIGS. 3 and 4 disclose alternative arrangements fro the side curtain airbag 24 and including a forward chamber 40. As shown in FIG. 3 and described above with regards to FIGS. 1 and 2, the forward chamber 40 may be an integral part of a larger main chamber 30. Thus, FIG. 3 is basically an inflated view of the forward portion of an assembled airbag made from the panels shown in FIGS. 2A and 2B. Alternatively, as shown in FIG. 4, the inflatable chamber 40 may be partially separated from a main chamber 30 by stitching or other structure connecting the inner and outer panels of the airbag. The forward chamber 40 is located inboard of the sail panel 50. The arrangements shown in FIGS. 3 and 4 may be applied to either the front or rear of the vehicle. Thus, for example, the chamber 40 may be located on the rear end of the airbag curtain adjacent the rear pillar (e.g., the C-pillar or D-pillar). Also, the sail panel 50 may be correspondingly located at the rear end of the airbag outboard the chamber 40 and connecting the chamber to a rear pillar of the vehicle. Also, the airbag may be configured so that both the forward and rearward ends of the airbag include inflatable chambers, stored with the main portion of the airbag as explained further below.

Figure 5A:
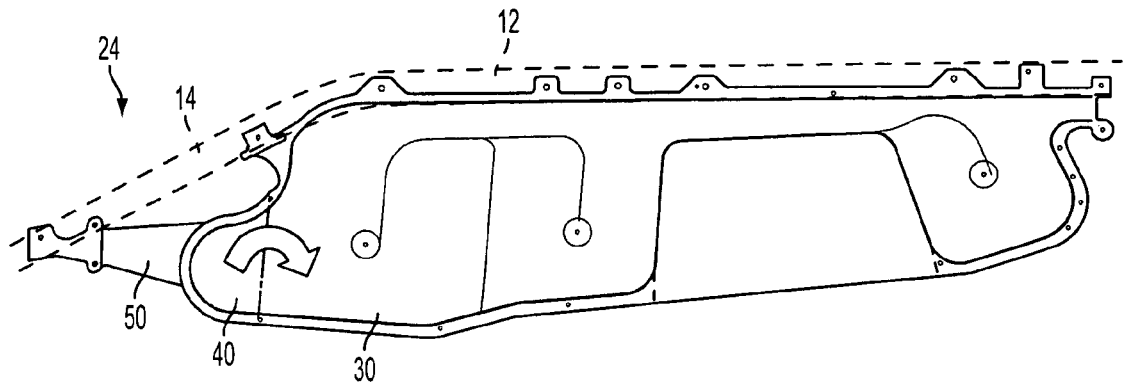
FIGS. 5A-5C illustrate a folding process for a side curtain airbag including an additional forward chamber according to an exemplary embodiment.
Figure 5B:
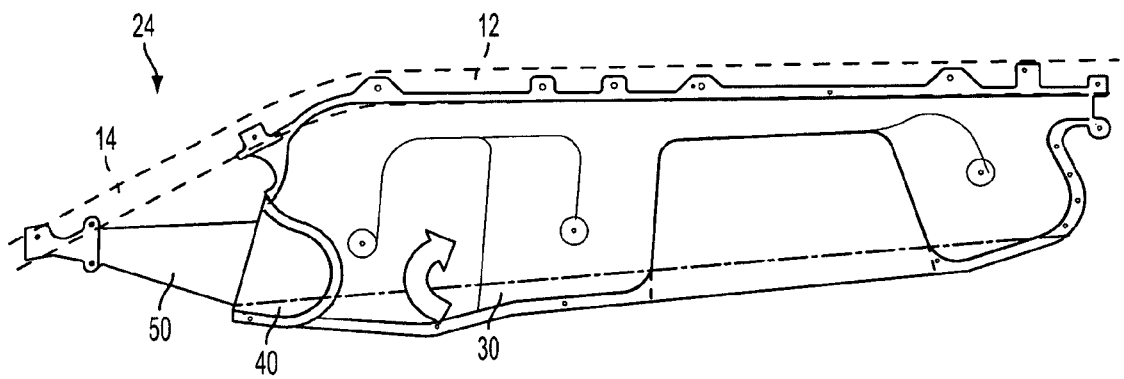
Figure 5C:
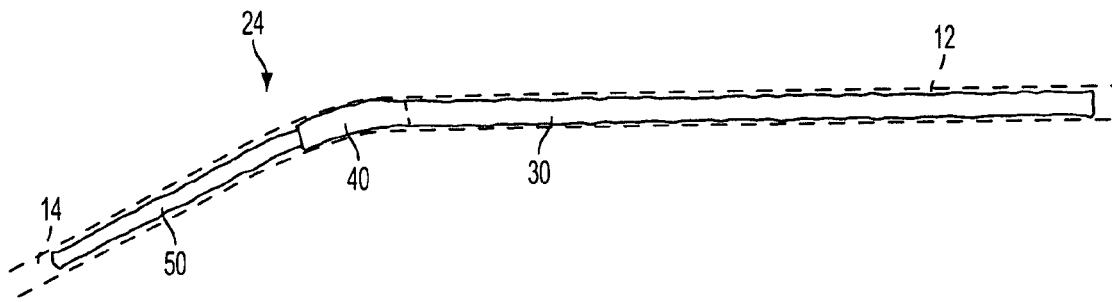

As shown in FIGS. 5A-5C, when the cushion airbag 24 is folded to a stowed configuration, the forward chamber 40 is positioned such that the forward chamber overlies or is located within the folded main chamber 30. In many vehicles, there may be more limited space along the A-pillar 14 than along the roof rail 12. By positioning the forward chamber 40 on or within the main chamber 30, the forward chamber portion of the airbag may be moved away from the A-pillar 14 and be concealed stored along the roof rail 12. According to one exemplary embodiment, the forward chamber 40 is folded back on top of the main chamber 30 (FIG. 5A), for example similar to a hinge. The hinge is generally located at substantially the same location as the seam connecting the tether or sail panel 50 to the airbag. Thus, when inflated the forward (or rearward) chamber is supported along the entire longitudinal length of the chamber by the panel 50. According to other exemplary embodiments, a wide variety of methods may be used to move the chamber 40 on top of or within the main chamber 30. For example, the chamber 40 may be Z-folded or accordion folded, tucked inside the main chamber 30, rolled, or a combination of any of these or any other folds or methods.

After the forward chamber 40 is moved on top of or within the main chamber 30, the curtain airbag 24 may be folded in a wide variety of manners to conceal it along the roof rail 12. According to one exemplary embodiment, the end of the cushion 24 remote from the roof rail 12 (e.g., the lower edge) is folded back on itself a number of times (FIG. 5B). The final fold of the curtain airbag 24 may be a half fold in the opposite direction (e.g., a "Z" fold). The forward chamber 40 is folded with the main chamber 30 of the curtain airbag 24 and is thus stored along the roof rail 12 instead of along the A-pillar 14 (FIG. 5C). Because the forward chamber 40 is stowed along the roof rail 12, a curtain airbag 24 with such a forward chamber 40 may be used in existing vehicles 10 with limited storage capacity along the A-pillar 14 without redesigning trim pieces used to cover the stowed curtain airbag 24. Likewise, as the main chamber 30 of the curtain airbag 24 remains substantially unchanged, existing inflation systems and firing circuits may be utilized.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent or releasable in nature.

The construction and arrangement of the elements of the curtain airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. Other substitutions, modifications, changes and omissions may be made in the design, operating conditions and arrangement of the exemplary embodiments.

What is claimed is:

1. An airbag module for use in a vehicle to protect an occupant of the vehicle from a side impact collision, comprising:
    an inflator configured to generate gas; and
    an airbag coupled to the inflator and configured to deploy upon receiving gas from the inflator, the airbag comprising:
        a main chamber extending along a side of an interior roof the vehicle and configured to restrain a head of a vehicle occupant when the airbag is deployed, the main chamber comprising an inboard panel and an outboard panel joined together;
        a forward chamber including an inboard panel and an outboard panel connected to form an inflatable chamber and, wherein the forward chamber extends from the main chamber towards an A-pillar of the vehicle and configured to restrain at least a portion of the vehicle occupant when the airbag is deployed; and
        a connecting panel connecting the airbag to the A-pillar, wherein the forward chamber is configured to deploy inboard and overlap with the connecting panel and wherein the connecting panel substantially covers the outboard panel and the inflatable chamber of the forward chamber when the airbag deploys and wherein the forward chamber does not overlap with a frame of the vehicle.

2. The airbag module of claim 1, wherein the forward chamber at least partially overlaps at least one of the inboard and outboard panels of the main chamber when the airbag is stowed.

3. The airbag module of claim 2, wherein the forward chamber is folded when the airbag is stowed.

4. The airbag module of claim 2, wherein the connecting panel is connected to the airbag at the same location where the forward chamber overlaps with the inboard or outboard panel in a stored condition.

5. The airbag module of claim 2, wherein the forward chamber is at least partially tucked within the inboard and outboard panels of the main chamber when the airbag is stowed.

6. The airbag module of claim 2, wherein the forward chamber is rolled over the inboard panel or within the main chamber when the airbag is stowed.

7. The airbag module of claim 2, wherein the airbag is stowed by Z-folding.

8. The airbag module of claim 1, wherein during a vehicle collision the forward chamber is configured to deploy with a trajectory positioning the forward chamber between the occupant and a portion of the vehicle before the occupant can collide with the portion of the vehicle.

9. The airbag module of claim 1, wherein the main chamber and forward chamber do not include an aperture passing through the inboard and outboard panels.

10. A side airbag for use in a vehicle, comprising:
    a main chamber extending along a side of an interior roof of the vehicle and configured to restrain a head of a vehicle occupant when the airbag is deployed, the main chamber comprising an inboard panel and an outboard panel joined together;
    a forward chamber including an inboard panel and an outboard panel connected to form an inflatable chamber and, wherein the forward chamber extends from the main chamber towards an A-pillar of the vehicle and configured to restrain at least a portion of the vehicle occupant when the airbag is deployed; and
    a connecting panel connecting the airbag to the A-pillar, wherein the forward chamber is configured to deploy inboard and overlap with the connecting panel wherein the connecting panel substantially covers the outboard panel and the inflatable chamber of the forward chamber when the airbag deploys and wherein the forward chamber does not overlap with a frame of the vehicle.

11. The airbag of claim 10, wherein the airbag is configured to be coupled to a roof rail of the vehicle.

12. The airbag of claim 10, wherein the main chamber and forward chamber do not include an aperture passing through the inboard and outboard panels.

13. The airbag of claim 10, wherein the airbag is stowed by Z-folding.

14. The airbag of claim 10, wherein during a vehicle collision the forward chamber is configured to deploy with a trajectory positioning the forward chamber between the occupant and a portion of the vehicle before the occupant can collide with the portion of the vehicle.

15. The airbag of claim 12, wherein the forward chamber is folded when the airbag is stowed.

16. The airbag of claim 10, wherein the forward chamber is rolled over the inboard panel or is at least partially rolled or tucked within the inboard and outboard panels the main chamber when the airbag is stowed.

17. A side airbag for use in a vehicle, comprising:
    a main chamber extending along a side of an interior roof of the vehicle and configured to restrain a head of a vehicle occupant when the airbag is deployed, the main chamber comprising an inboard panel and an outboard panel joined together;
    a chamber extending from the main chamber and configured to restrain at least a portion of the vehicle occupant when the airbag is deployed, the chamber located at the foremost or rearmost end of the airbag and; and herein the chamber includes an inboard panel and an outboard panel connected to form an inflatable chamber
    a connecting panel connecting the airbag to the A-pillar, wherein the chamber is configured to deploy inboard and overlap with the connecting panel so that the connecting panel substantially covers the outboard panel and the inflatable chamber and wherein the chamber does not overlap with a frame of the vehicle.

18. The airbag of claim 17, wherein the chamber at least partially overlaps at least one of the inboard and outboard panels of the main chamber when the airbag is stowed.

19. The airbag module of claim 18, wherein during a vehicle collision the forward chamber is configured to deploy with a trajectory positioning the forward chamber between the occupant and a portion of the vehicle before the occupant can collide with the portion of the vehicle.

20. The airbag module of claim 18, wherein the connecting panel is directly coupled to an outboard panel of the main chamber.

* * * * *